United States Patent
Schulz et al.

(10) Patent No.: US 8,165,737 B2
(45) Date of Patent: *Apr. 24, 2012

(54) METHOD AND SYSTEM FOR CONTROLLING A POWER INVERTER IN ELECTRIC DRIVES OF VEHICLES WITH TWO-MODE TRANSMISSIONS

(75) Inventors: Steven E. Schulz, Torrance, CA (US); Stephen T. West, New Palestine, IN (US); Brian A. Welchko, Torrance, CA (US); Silva Hiti, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1184 days.

This patent is subject to a terminal disclaimer.

(21) Appl. No.: 11/923,287

(22) Filed: Oct. 24, 2007

(65) Prior Publication Data

US 2009/0107742 A1    Apr. 30, 2009

(51) Int. Cl.
G05D 3/00    (2006.01)

(52) U.S. Cl. ............................ 701/22; 701/51; 318/432

(58) Field of Classification Search .................... 701/22, 701/51; 318/342, 434; 180/65.7, 65.28, 180/65.51
See application file for complete search history.

(56) References Cited

U.S. PATENT DOCUMENTS

| | | | |
|---|---|---|---|
| 6,527,659 B1 * | 3/2003 | Klemen et al. ................... 475/5 |
| 6,864,646 B2 * | 3/2005 | Rahman et al. ................... 318/41 |
| 6,979,968 B2 * | 12/2005 | Nagashima et al. ........... 318/268 |
| 7,154,236 B1 * | 12/2006 | Heap ............................... 318/9 |
| 7,559,388 B2 * | 7/2009 | Severinsky et al. ......... 180/65.28 |
| 7,652,443 B2 * | 1/2010 | Schulz et al. ................. 318/432 |
| 7,663,329 B2 * | 2/2010 | Muta .............................. 318/432 |
| 2004/0160201 A1 * | 8/2004 | Rahman et al. ................. 318/41 |
| 2005/0073272 A1 * | 4/2005 | Nagashima et al. ........... 318/268 |
| 2006/0175995 A1 * | 8/2006 | Shinmura et al. .............. 318/139 |
| 2006/0231304 A1 * | 10/2006 | Severinsky et al. .......... 180/65.2 |
| 2007/0114965 A1 * | 5/2007 | Kutsuna et al. ................ 318/807 |
| 2007/0169970 A1 * | 7/2007 | Kydd ............................ 180/65.2 |
| 2007/0171689 A1 * | 7/2007 | Ishikawa et al. ................ 363/71 |
| 2007/0175429 A1 * | 8/2007 | Yanagida et al. ......... 123/179.14 |
| 2007/0202987 A1 * | 8/2007 | Kakinami et al. ................ 477/3 |
| 2007/0290650 A1 * | 12/2007 | Muta .............................. 318/799 |
| 2008/0064559 A1 * | 3/2008 | Cawthorne et al. ................ 477/5 |
| 2008/0066980 A1 * | 3/2008 | James .......................... 180/65.5 |
| 2008/0234097 A1 * | 9/2008 | Sah .................................. 477/3 |
| 2008/0258661 A1 * | 10/2008 | Nagashima et al. ..... 318/400.29 |
| 2008/0303470 A1 * | 12/2008 | Schulz et al. .................. 318/562 |
| 2008/0306643 A1 * | 12/2008 | Hanyu et al. .................. 701/22 |
| 2009/0001906 A1 * | 1/2009 | Murrell et al. .................. 318/34 |
| 2009/0011895 A1 * | 1/2009 | Tabata et al. ..................... 477/3 |
| 2009/0033251 A1 * | 2/2009 | Perisic et al. ................. 318/105 |
| 2009/0037061 A1 * | 2/2009 | Tabata et al. ................... 701/55 |
| 2009/0069142 A1 * | 3/2009 | Welchko et al. .............. 475/276 |

* cited by examiner

*Primary Examiner* — Helal A Algahaim
(74) *Attorney, Agent, or Firm* — Ingrassia Fisher & Lorenz, P.C.

(57) ABSTRACT

Methods and systems for controlling a power inverter in automobiles utilizing two-mode transmissions are provided. The various embodiments control the power inverter by, responsive to a commanded torque of the electric motor being below a first torque level, controlling the power inverter to set a switching frequency of the power inverter at a first set frequency; and, responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit. The method reduces switching frequencies in the inverter at high commanded torques, while maintaining the switching frequencies above dynamic frequency limit that provides effective control over the motor.

17 Claims, 4 Drawing Sheets

METHOD AND SYSTEM FOR CONTROLLING A POWER INVERTER IN ELECTRIC DRIVES OF VEHICLES WITH TWO-MODE TRANSMISSIONS

TECHNICAL FIELD

The present invention generally relates to power inverters, and more particularly relates to methods and systems for controlling power inverters in electric drive systems of automobiles utilizing two-mode transmissions.

BACKGROUND OF THE INVENTION

In recent years, advances in technology, as well as ever evolving tastes in style, have led to substantial changes in the design of automobiles. One of the changes involves the complexity of the electrical systems within automobiles, particularly alternative fuel vehicles, such as hybrid, electric, and fuel cell vehicles. Such alternative fuel vehicles typically use an electric motor, perhaps in combination with another actuator, to drive the wheels.

These types of vehicles can offer significant improvements in efficiency. There remains, however, an ever present need to improve the efficiency of electric motor drives to reduce power losses, improve battery life, and increase range. Additionally, it is generally desirable to reduce the noise generated from the automobile. Unfortunately, some techniques for reducing power losses in the electric motor system can increase acoustic noise emissions beyond acceptable levels.

Accordingly, it is desirable to provide a control method that reduces power losses and increases the efficiency of electric motors in automobiles, without excessively increasing the acoustic noise generated by the electrical motor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a method for controlling a power inverter in an electric drive system of an automobile is provided. In general, the method controls the power inverter by, responsive to a commanded torque of the electric motor being below a first torque level, controlling the power inverter to set a switching frequency of the power inverter at a first set frequency; and, responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit. The method reduces switching frequencies in the inverter at high commanded torques, while maintaining the switching frequencies above a dynamic frequency limit that provides effective control over the motor. This reduces power loss and thus improves the efficiency of the system.

In a further embodiment, an automotive electric drive system is provided. The system includes a prime mover power source and a two-mode, compound-split, electro-mechanical transmission, including first and second motors, coupled to the prime mover power source, a power inverter coupled to the first and second motors, and a processor coupled to the first and second motors and the power inverter. The at least one processor is configured to, responsive to a commanded torque of the electric motor being below a first torque level, provide a signal controlling the power inverter to set a switching frequency of the power inverter at a first set frequency; and, responsive to the commanded torque of the electric motor being between the first torque level and a second torque level, provide a signal controlling the power inverter to determine the switching frequency of the power inverter as a function of the commanded torque of the electric motor while maintaining the switching frequency above a dynamic frequency limit. The system reduces switching frequencies in the inverter at high commanded torques, while maintaining the switching frequencies above a dynamic frequency limit that provides effective control over the motor. This reduces power loss and thus improves the efficiency of the system.

In a further embodiment, an automotive electric drive system is provided. The system includes a prime mover power source and a two-mode, compound-split, electro-mechanical transmission, including first and second motors, coupled to the prime mover power source, a power inverter coupled to the first and second motors, and a processor coupled to the first and second motors and the power inverter. The transmission includes an input member to receive power from the prime mover, an output member to deliver power from the transmission, first and second motors being coaxially aligned, first, second, and third coaxially aligned planetary gear arrangements, each planetary gear arrangement utilizing first, second and third gear members, the first and second motors being coaxially aligned with the three planetary gear arrangements, at least one of the first, second, and third gear members in the first or second planetary gear arrangement being connected to the first motor, and another one of the first, second, and third gear members in the second and third planetary gear arrangements being connected to the second motor, one of the gear members of the first planetary gear arrangement being continuously connected to the input member, a first torque-transmitting mechanism to selectively connect one of the gear members associated with each of the planetary gear arrangements to each other and to the output member, a second torque-transmitting mechanism to selectively connect one of the gear members of the third planetary gear set with ground, a third torque-transmitting mechanism to selectively connect one of the gear members of the second planetary gear set with another of the gear members of the second planetary gear set, a first interconnecting member continuously connecting one of the members of the first planetary gear set with one of the members of the second planetary gear set, and a second interconnecting member continuously connecting one of the members of the second planetary gear set with one of the members of the third planetary gear set. The at least one processor is configured to, responsive to a commanded torque of the electric motor being below a first torque level, provide a signal controlling the power inverter to set a switching frequency of the power inverter at a first set frequency; and, responsive to the commanded torque of the electric motor being between the first torque level and a second torque level, provide a signal controlling the power inverter to determine the switching frequency of the power inverter as a function of the commanded torque of the electric motor while maintaining the switching frequency above a dynamic frequency limit. The system reduces switching frequencies in the inverter at high commanded torques, while maintaining the switching frequencies above dynamic frequency limit that provides effective control over the motor. This reduces power loss and thus improves the efficiency of the system.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that the figures are merely illustrative and may not be drawn to scale.

The figures illustrate a method and a system for controlling a power inverter in an electric drive system of an automobile. The system includes a prime mover power source and a two-mode, compound-split, electro-mechanical transmission, including first and second motors, coupled to the prime mover power source, a power inverter coupled to the first and second motors, and at least one processor coupled to the first and second motors and the power inverter. In general, the system and method controls the power inverter by, responsive to a commanded torque of the electric motor being below a first torque level, controlling the power inverter to set a switching frequency of the power inverter at a first set frequency; and, responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit. The method reduces switching frequencies in the inverter at high commanded torques, while maintaining the switching frequencies above dynamic frequency limit that provides effective control over the motor. This reduces power loss and thus improves the efficiency of the system.

Figure 1:
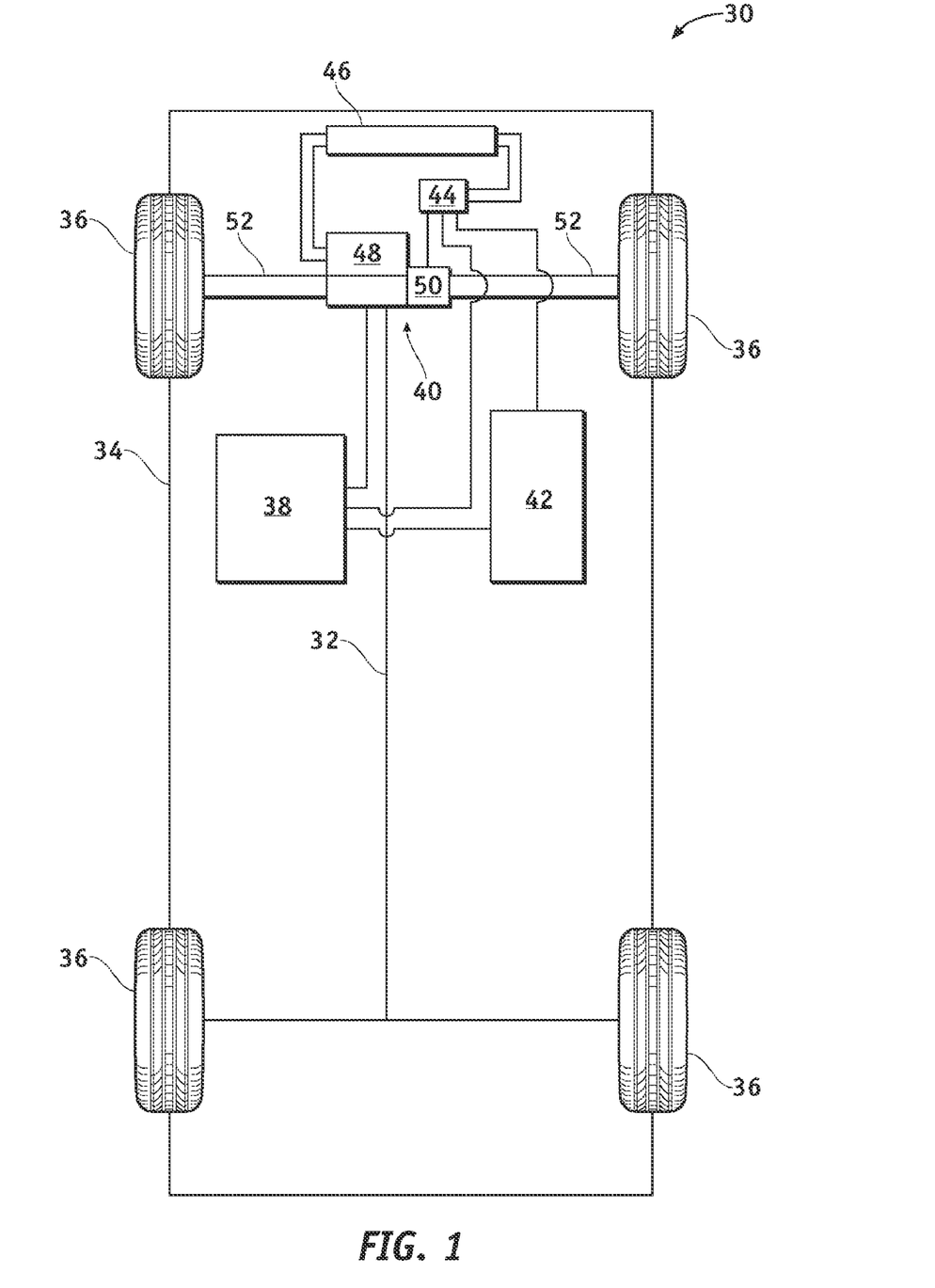
FIG. 1 is a schematic view of an exemplary automobile according to one embodiment of the present invention.

FIG. 1 illustrates a vehicle 30, or "automobile," according to one embodiment of the present invention. The automobile 30 includes a chassis 32, a body 34, four wheels 36, and an electronic control system 38. The body 34 is arranged on the chassis 32 and substantially encloses the other components of the automobile 30. The body 34 and the chassis 32 may jointly form a frame. The wheels 36 are each rotationally coupled to the chassis 32 near a respective corner of the body 34.

The automobile 30 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 30 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine or fuel cell energy source, a combustion/electric motor hybrid engine, and an electric motor.

In the exemplary embodiment illustrated in FIG. 1, the automobile 30 is a hybrid vehicle, and further includes an actuator assembly 40, a battery (or other electrical energy storage) 42, a power inverter (or inverter) 44, and a radiator 46. The actuator assembly 40 includes a combustion engine 48 and an electric motor/generator (or motor) 50. The electric motor 50 is, in one embodiment, a sinusoidally-wound alternating current (AC) motor (e.g., permanent magnet or induction) such as commonly used in automotive vehicles (e.g., traction drive control systems, and the like). As will be appreciated by one skilled in the art, the electric motor 50 may include a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 50 may include multiple (e.g., twelve) electromagnetic poles, as is commonly understood.

Still referring to FIG. 1, in one embodiment, the combustion engine 48 and the electric motor 50 are integrated such that both are mechanically coupled to at least some of the wheels 36 through one or more drive shafts 52. The radiator 46 is connected to the frame at an outer portion thereof and although not illustrated in detail, includes multiple cooling channels therethough that contain a cooling fluid (i.e., coolant) such as water and/or ethylene glycol (i.e., "antifreeze) and is coupled to the engine 48 and the inverter 44. Referring again to FIG. 1, in the depicted embodiment, the inverter 44 receives and shares coolant with the electric motor 50. The radiator 46 may be similarly connected to the inverter 44 and/or the electric motor 50.

The electronic control system 38 is in operable communication with the actuator assembly 40, the battery 42, and the inverter 44. Although not shown in detail, the electronic control system 38 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

Figure 2:
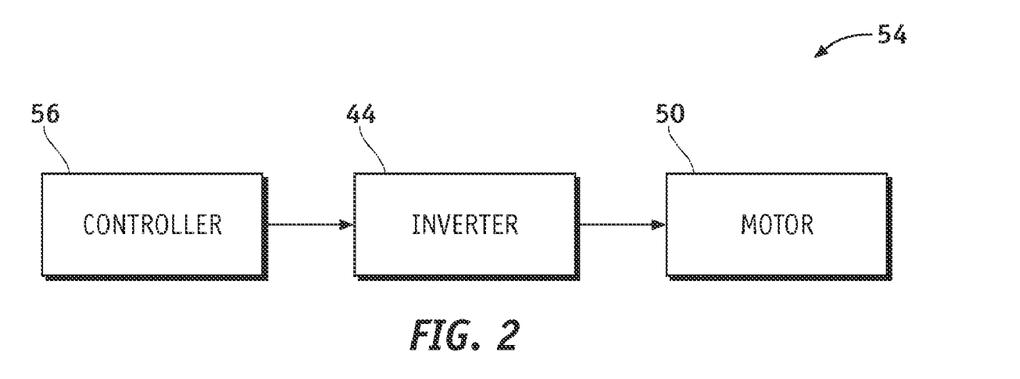
FIG. 2 is a block diagram of a voltage source inverter system within the automobile of FIG. 1.

Referring to FIG. 2, a voltage source inverter system (or electric drive system) 54 is shown in accordance with an exemplary embodiment of the present invention. The voltage source inverter system 54 includes a controller 56, the inverter 44 coupled to an output of the controller 56, and the motor 50 coupled to a first output of the inverter 44. The controller 56 and may be integral with the electronic control system 38 shown in FIG. 1.

Figure 3:
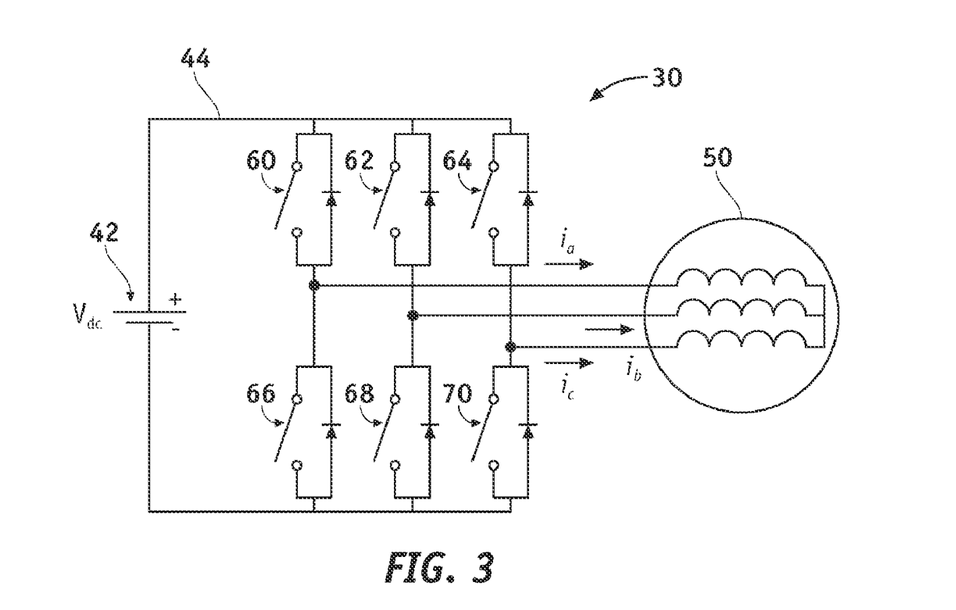
FIG. 3 is a schematic view of an inverter within the automobile of FIG. 1.

FIG. 3 illustrates the inverter 44 of FIGS. 1 and 2 in greater detail. The inverter 44 includes a three-phase circuit coupled to the motor 50. More specifically, the inverter 44 includes a switch network having a first input coupled to a voltage source $V_{dc}$ (e.g., the battery 42) and an output coupled to the motor 50.

The switch network comprises three pairs of series switches with antiparallel diodes (i.e., antiparallel to each switch) corresponding to each of the phases. Each of the pairs of series switches comprises a first switch (or transistor) 60, 62, and 64 having a first terminal coupled to a positive electrode of the voltage source 42 and a second switch 66, 68, and 70 having a second terminal coupled to a negative electrode of the voltage source 42 and having a first terminal coupled to a second terminal of the respective first switch 60, 62, and 64.

Figures 4, 5:
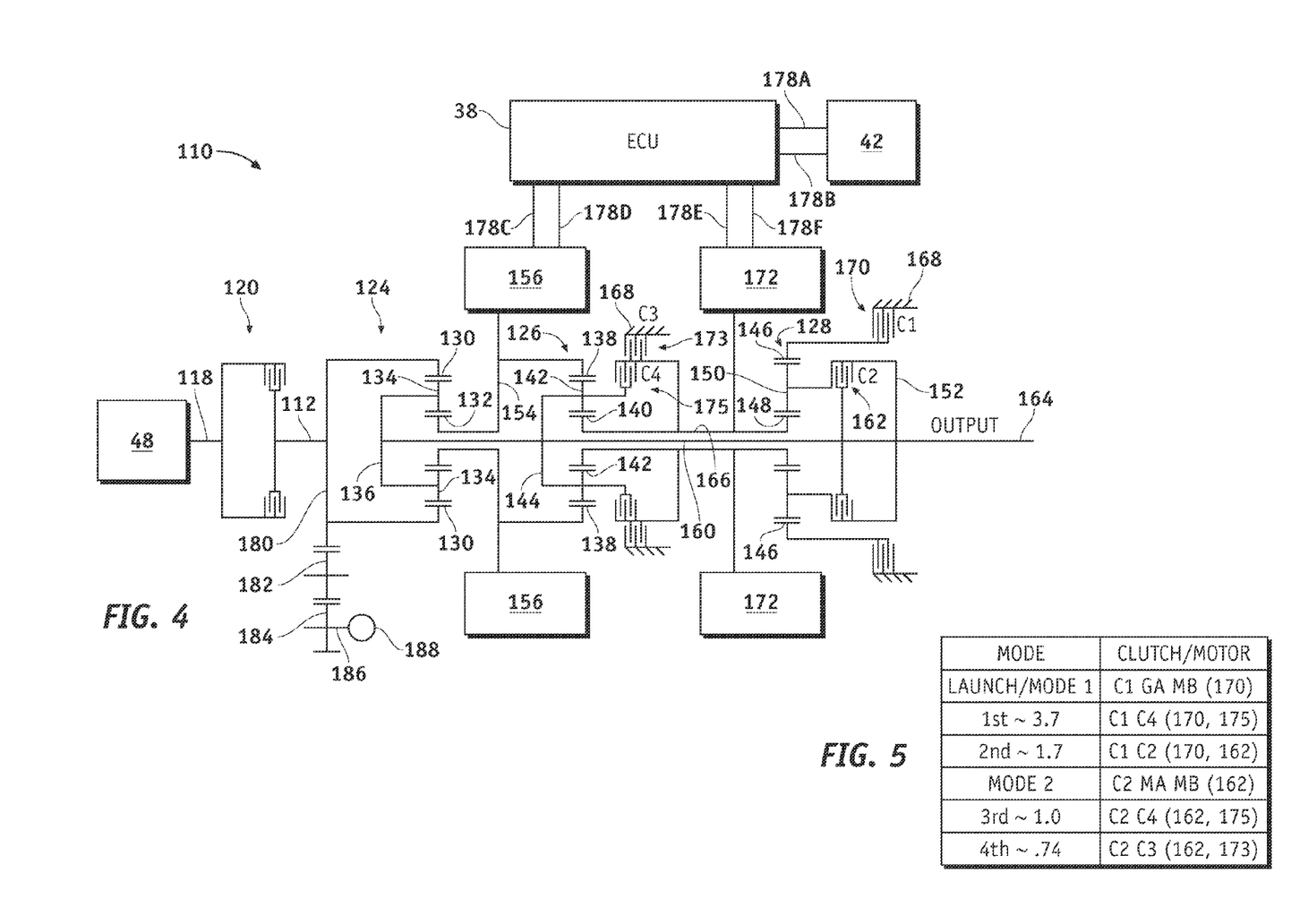
FIG. 4 is a schematic view of a two-mode, compound-split, electro-mechanical transmission within the automobile of FIG. 1.
FIG. 5 is a truth table presenting fixed ratios for the operation of the transmission of FIG. 4.

FIG. 4 illustrates the powertrain transmission 110 within the automobile 30 (FIG. 1), according to an exemplary embodiment. The depicted embodiment is a two-mode, compound-split, electro-mechanical (or hybrid) transmission. The hybrid transmission 110 has an input member 112 that may be in the nature of a shaft which may be directly driven by the combustion engine 48. A transient torque damper may be incorporated between an output shaft 118 of the engine 48 and the input member 112 of the hybrid transmission 110. An example of a transient torque damper of the type recommended for the present usage is disclosed in detail in U.S. Pat. No. 5,009,301 which issued on Apr. 23, 1991 to General Motors Corporation, which is hereby incorporated by reference in its entirety. The transient torque damper may incorporate, or be employed in conjunction with, a torque transfer device 120 to permit selective engagement of the engine 48 with the hybrid transmission 110, but it should be understood that the torque transfer device 120 is not utilized to change, or control, the mode in which the hybrid transmission 110 operates.

In the embodiment depicted, the engine 48 (or prime mover power source) may be a fossil fuel engine, such as a diesel engine that is readily adapted to provide its available power output delivered at a constant number of revolutions per minute (RPM). Irrespective of the means by which the engine 48 is connected to the input member 112 of the transmission 110, the input member 112 is connected to a planetary gear set 124 in the transmission 110.

The hybrid transmission 110 utilizes three planetary gear sets (or arrangements) 124, 126, and 128. The first planetary gear set 124 has an outer gear member 130 that may generally be designated as the ring gear, which circumscribes an inner gear member 132, generally designated as the sun gear. A plurality of planet gear members 134 are rotatably mounted on a carrier 136 such that each planet gear member 134 meshingly engages both the outer gear member 130 and the inner gear member 132.

The second planetary gear set 126 also has an outer gear member 138, generally designated as the ring gear, which circumscribes an inner gear member 140, generally designated as the sun gear. A plurality of planet gear members 142 are rotatably mounted on a carrier 144 such that each planet gear 142 meshingly engages both the outer gear member 138 and the inner gear member 140.

The third planetary gear set 128 also has an outer gear member 146, generally designated as the ring gear, which circumscribes an inner gear member 148, generally designated as the sun gear. A plurality of planet gear members 150 are rotatably mounted on a carrier 152 such that each planet gear 150 meshingly engages both the outer gear member 146 and the inner gear member 148.

In one embodiment, the ring gear/sun gear tooth ratio of the first planetary gear set 124 is 65/33, the ring gear/sun gear tooth ratio of the second planetary gear set 126 is 65/33, and the ring gear/sun gear tooth ratio of the third planetary gear set 128 is 94/34.

While all three planetary gear sets 124, 126 and 128 are "simple" planetary gear sets in their own right, the first and second planetary gear sets 124 and 126 are compounded in that the inner gear member 132 of the first planetary gear set 124 is conjoined, as through a hub plate gear 154, to the outer gear member 138 of the second planetary gear set 126. The conjoined inner gear member 132 of the first planetary gear set 124 and the outer gear member 138 of the second planetary gear set 126 are continuously connected to a first motor/generator 156.

The planetary gear sets 124 and 126 are further compounded in that the carrier 136 of the first planetary gear set 124 is conjoined, as through a shaft 160, to the carrier 144 of the second planetary gear set 126. As such, carriers 136 and 144 of the first and second planetary gear sets 124 and 126, respectively, are conjoined. The shaft 160 is also selectively connected to the carrier 152 of the third planetary gear set 128, as through a torque transfer device 162 which, as will be hereinafter more fully explained, is employed to assist in the selection of the operational modes of the hybrid transmission 110.

The carrier 152 of the third planetary gear set 128 is connected directly to the transmission output member 164. When the hybrid transmission 110 is used in a land vehicle, the output member 164 may be connected to the vehicular axles (not shown) that may, in turn, terminate in the drive shafts 52 (shown in FIG. 1).

The inner gear member 140 of the second planetary gear set 126 is connected to the inner gear member 148 of the third planetary gear set 128, as through a sleeve shaft 166 that circumscribes shaft 160. The outer gear member 146 of the third planetary gear set 128 is selectively connected to ground, represented by the transmission housing 168, through a torque transfer device 170. The torque transfer device 170, as is also hereinafter explained, is also employed to assist in the selection of the operational modes of the hybrid transmission 110. The sleeve shaft 166 is also continuously connected to a second motor/generator 172. All the planetary gear sets 124, 126 and 128 as well as the two motor/generators 156 and 172 are coaxially oriented, as about the axially disposed shaft 160. It should be noted that both motor/generators 156 and 172 are of an annular configuration which permits them to circumscribe the three planetary gear sets 124, 126 and 128 such that the planetary gear sets 124, 126 and 128 are disposed radially inwardly of the motor/generators 156 and 172. This configuration assures that the overall envelope—i.e., the circumferential dimension—of the transmission 110 is minimized.

A torque transfer device 173 selectively connects the sun gear 140 with ground (i.e., with transmission housing 168). A torque transfer device 175 is operative as a lock-up clutch, locking planetary gear sets 124, 126, motors 156, 172 and the input to rotate as a group, by selectively connecting the sun gear 140 with the carrier 144. The torque transfer devices 162, 170, 173, 175 are all friction clutches.

As was previously herein explained in conjunction with the description of the engine 48, it should similarly be understood that the rotational speed and horsepower output of the first and second motor/generators 156 and 172 are also not critical to the invention, but for the purpose of effecting an absolutely clear understanding of the hybrid transmission 110, the motors/generators 156 and 172 have a continuous rating of 30 horsepower and a maximum speed of approximately 10200 RPM. The continuous power rating is approximately 1/10 that of the engine 48, and the maximum speed is approximately 1.5× that of the engine 48, although these depend on the type of engine, final gear schematic and duty cycle.

As should be apparent from the foregoing description, and with particular reference to FIG. 2, the transmission 110 selectively receives power from the engine 48. As will now be explained, the hybrid transmission 110 also receives power from the battery 42, the ECU 38 via transfer conductors 178A and 178B. The ECU 38 communicates with the first motor/generator 156 by transfer conductors 178C and 178D, and the ECU 38 similarly communicates with the second motor/generator 172 by transfer conductors 178E and 178F.

As apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 178, but the specific, individual transfer conductors are, therefore, identified as 178A, 178B, 178C, 178D, 178E and 178F in the specification and on the drawings. This same suffix convention shall be employed throughout the specification.

A drive gear 180 may be presented from the input member 112. As depicted, the drive gear 180 fixedly connects the input member 112 to the outer gear member 130 of the first planetary gear set 124, and the drive gear 180, therefore, receives power from the engine 48 and/or the motor/generators 156 and/or 172. The drive gear 180 meshingly engages an idler gear 182 which, in turn, meshingly engages a transfer gear 184 that is secured to one end of a shaft 186. The other end of the shaft 186 may be secured to a transmission fluid pump and/or PTO unit, designated either individually or collectively at 188.

The ECU 38 obtains information from both the first and second motor/generators 156 and 172, respectively, the engine 48 and the battery 42. In response to an operator's action, or "operator demand" (e.g., from a drive range selector, an accelerator pedal, and/or a brake pedal), the ECU 38 determines what is required and then manipulates the selectively operated components of the hybrid transmission 110 appropriately to respond to the operator demand.

For example, in the exemplary embodiment shown in FIG. 4, when the operator has selected a forward drive range and manipulates either the accelerator pedal or the brake pedal, the ECU 38 determines if the vehicle should accelerate or decelerate. The ECU 38 also monitors the state of the power sources and determines the output of the transmission required to affect the desired rate of acceleration or deceleration. Under the direction of the ECU 38, the transmission is capable of providing a range of output speeds from slow to fast in order to meet the operator demand.

The transmission 110 operates as a two-mode, compound-split, electro-mechanical, vehicular transmission. In other words, the output member 164 receives power through two distinct gear trains within the transmission 110. A first mode, or gear train, is selected when the torque transfer device 170 is actuated in order to "ground" the outer gear member 146 of the third planetary gear set 128. A second mode, or gear train, is selected when the torque transfer device 170 is released and the torque transfer device 162 is simultaneously actuated to connect the shaft 160 to the carrier 152 of the third planetary gear set 128.

Those skilled in the art will appreciate that the ECU 38 serves to provide a range of output speeds from relatively slow to relatively fast within each mode of operation. This combination of two modes with a slow to fast output speed range in each mode allows the transmission 110 to propel a vehicle from a stationary condition to highway speeds. Additionally, the ECU 38 coordinates operation of the transmission 110 so as to allow synchronized shifts between the modes.

First and second "modes" of operation refer to circumstances in which the transmission functions are controlled by one clutch (e.g., clutch 162 or clutch 170), and the controlled speed and torque of the motor/generators 156 and 172, all as described in U.S. Pat. No. 5,009,301 which issued on Apr. 23, 1991 to General Motors Corporation. Also, certain "ranges" of operation may be achieved by applying an additional clutch (e.g., clutch 162, 173 or 175).

When the additional clutch is applied (i.e., when two clutching mechanisms are applied), a fixed input to output speed ratio (i.e., a fixed gear ratio) is achieved, as illustrated in the truth table of FIG. 5. The rotations of the motor/generators 156 and 172 will then be dependent on internal rotation of the mechanism as defined by the clutching and proportional to the input speed. The motor/generators 156 and 172 are completely independent of engine to output power flow, thereby enabling both to be motors, both to function as generators, or any combination thereof. This allows, for instance, during acceleration in the first fixed ratio that the engine power and both units functioning as motors accepting power from the battery 42 to be additive into propelling the vehicle through third planetary gear set 128 to the output 164.

It also should be noted that the function of the transmission can at any time be switched from operation in fixed ratio to mode control by actuating the additional clutch (i.e., on or off) during a mode of operation. Determination of operation in fixed ratio or mode control is by algorithms in the ECU 38 controlling the transmission.

Additionally, the modes of operation may overlap the fixed ratios of operation. Selection of the mode or fixed ratio depends again on the driver's input and response of the vehicle thereto. In one embodiment, the first range falls within the first mode of operation when C1 and C4 (i.e., clutches 170 and 175) are engaged, and the second range falls within the first mode of operation when C2 and C1 (clutches 162 and 170) are engaged. As illustrated in FIG. 5, a third fixed ratio range is available during the second mode of operation when C2 and C4 (clutches 162 and 175) are engaged, and a fourth fixed ratio range is available during the second mode of operation when C2 and C3 (clutches 162 and 173) are engaged.

In the first mode of operation, and when the ECU 38 has determined that the operator desires to move forwardly from a stationary condition, and to accelerate, the torque transfer device 120 is engaged operatively to connect the engine 48 to the hybrid transmission 110. The torque transfer device 120 remains applied as the vehicle moves forwardly through a speed range hereinafter more fully described. The torque transfer device 162 is not applied and remains disengaged, while the torque transfer device 170 is engaged. In this situation, the engine 48 applies driving power to the outer gear member 130 of the first planetary gear set 124 such that the outer member 130 rotates in unison with the input member 112 (and thus the engine 48). The first motor/generator 156 simultaneously rotates the inner gear member 132 of the first planetary gear set 124 and the outer gear member 138 of the second planetary gear set 126 in the same direction, thus driving the carrier 136 in the same direction, which effects rotation of the inner gear member 140 of the second planetary gear set 124.

The second motor/generator 172 operates as a motor during the first mode, and as such drives sleeve shaft 166 in a direction which causes the inner gear member 148 of the third planetary gear set 128 to rotate the planet gears 150 of the third planetary gear set 128 against the outer gear member 146 of the third planetary gear set 128. The outer gear member 146 is fixed by having been grounded so that the carrier 152 drives the output member 164 in a direction required to effect forward movement of the vehicle.

The rotation of the sleeve shaft 166 affected by rotation of the second motor/generator 172 operating as a motor also rotates the inner gear member 140 of the second planetary gear set 126. Because the torque transfer device 162 remains disengaged, the carriers 136 and 144 of the first and second planetary gear sets 124 and 126, respectively, are freely rotatable, but only in unison inasmuch as the two carriers 136 and 144 are compounded. As a result, the rotation of the outer gear member 130 of the first planetary gear set 124 caused by the engine 48 and the rotation of the inner gear member 140 caused by the second motor/generator 172 force the inner gear member 132 of the first planetary gear set 124 and the conjoined outer gear member 138 of the second planetary gear set 126 to drive the first motor/generator 156 in that direction (and with that velocity), which causes the first motor/generator 56, at least initially, to serve as a generator.

In one mode, the transmission operates in the first mode from rest (i.e., the vehicle is not moving) to about 70 MPH. At speeds greater than about 70 MPH the transmission operates in the second mode.

Fixed gear ratios can also be selected, overlapping the operation of the modes, to further improve acceleration by increasing the power reaching the output 164 and/or to improve efficiency.

At about 70 MPH, the lock-up clutch 175 is engaged while the clutch 170 remains engaged. In this configuration, the transmission 110 is engaged in the first fixed ratio as defined by the third planetary gear set 128, as shown FIG. 5. When the clutch 175 is engaged, the first two gear sets 124 and 126 and motor/generators 156 and 172 rotate at the input speed and are connected with the sun gear 148 of the third planetary gear set 128. With the clutch 170 also engaged there is a speed reduction provided by the third planetary gear set 128 which results in torque being multiplied. All power is transmitted mechanically through the planetary gear sets (i.e., no torque is present in the motors/generators 156 and 172), which minimizes electrical losses and provides higher efficiency operation. However, with full torque applied in the first and second motor/generators 156 and 172, a significant increase in performance can be realized. With both motors locked together by device 175, the first and second motor/generators 156 and 172 can also share equally any regenerative power, resulting in higher braking performance with improved cooling. Only the third planetary gear set 128 is active because the torque transmitting device (or lock-up clutch) 175 locks up the first and second planetary gear sets 124 and 126. Engagement of the torque transmitting device 175 also protects the motor/generators 156 and 172 if the power flow necessary for power split operation would overload the motor/generators. Therefore, if the vehicle is towing or hauling up a hill, the motors/generators are protected.

During normal operation, only the clutch 170 would be engaged at low speeds, but if maximum power is demanded, the lock-up clutch 175 is also engaged. The first and second motors 156 and 172 may be activated with the clutch 175 to achieve maximum available horsepower. This clutch also provides the ability for all three of the engine 48 and motor/generators 156 and 172 to simultaneously propel the vehicle for maximum acceleration.

In one embodiment, at about 40 MPH, the lock-up clutch 175 is disengaged. Thereafter, the second motor/generator 172 operates as a motor. The first motor/generator 156 operates as a generator up to a point at which the first motor/generator 156 is stationary (e.g., approximately 52 MPH). The motor/generator 156 then reverses direction and operates as a motor.

The clutch 162 is engaged at, for example, about 57 MPH. With the clutches 162 and 170 engaged, a second fixed ratio is achieved (e.g., 1.7:1 as shown in FIG. 5). During the second fixed ratio, all three gear sets 124, 126, and 128 are active. The motor/generators 156 and 172 may be turned off during the engagement of the clutches 162 and 170 for fully mechanical operation. During the second fixed ratio, the motors 156 and 172 may spin freely with no torque being present. The first mode ends when the clutch 170 is turned off and the clutch 162 remains engaged for the high-efficiency second mode of operation.

In the above description, the transmission mode I as described in U.S. Pat. No. 5,009,301 is supplemented with the ability to launch in mode I, shift to fixed ratio 1, return to mode I, and then to fixed ratio 2. The actual operation in the vehicle is determined by inputs to the ECU 38. The transmission may be operated in only mode I, or any combination as necessary to improve efficiency, performance, or braking power.

In an exemplary embodiment, the outer gear members 130 and 138 in each of the first and second planetary gear sets 124 and 126 have 65 teeth, and the inner gear members 132 and 140 in each of the first and second planetary gear sets 124 and 126 have 33 teeth. The outer gear member 146 of the third planetary gear set 128 has 94 teeth, and the inner gear member 148 of the third planetary gear set 128 has 34 teeth. With the configuration of the transmission 110 heretofore described, and with the aforesaid number of teeth on the inner and outer gear members, the transmission provides a mechanical point (i.e., at about 50 MPH) while operating in the first mode, at which the first motor/generator 56 has a zero rotational speed. To complete the description as to the operation of the motor/generators in the exemplary environment described, one must consider operation of the transmission in the second mode of operation.

The transition from the first (mode I) to the second mode (mode II) of operation is achieved by disengaging the torque transfer device 170 and continuing the application of the torque transfer device 162. In a manner similar to the previously described first mode, the second mode overlaps fixed ratios as shown in FIG. 5.

At the inception of the second mode of operation, the first motor/generator 156 transitions from operating as a motor to operating as a generator. The first motor/generator 156 continues to operate as a generator during operation of the transmission 110 in the second mode while the vehicle gains speed from, for example, about 70 MPH to about 88 MPH. At about 88 MPH, the first motor/generator 156 transitions from operation as a generator back to operation as a motor as it transitions through a mechanical point wherein the motor/generator 156 has zero rotational speed. The first motor/generator 156 continues thereafter to operate as a motor.

At the beginning of the second mode of operation, the second motor/generator 172 continues to operate as a motor. In fact, the second motor/generator 172 operates as a motor until the vehicle reaches a speed of about 88 MPH, at which point it transitions to operation as a generator, and continues thereafter to operate as a generator.

With the configuration of the transmission 110 heretofore described, and with the aforesaid number of teeth on the inner and outer gear members, the transmission 110 provides two mechanical points while operating in the second mode. That is, in one embodiment, the first motor/generator 156 has a zero rotational speed at about 88 MPH, and the second motor/generator 172 has a zero rotational speed at about 208 MPH.

As illustrated in FIG. 5, third and fourth fixed ratios are available during the second mode. The third fixed ratio may be established with the simultaneous engagement of the clutches 162 and 175, which locks all gear sets into a 1:1 ratio so that the output 164 rotates at the same speed as the input 112.

The fourth fixed ratio is established with the engagement of the clutches 162 and 173 to provide a fixed overdrive ratio of 0.74:1, as shown in FIG. 2. In the fourth fixed ratio, the first and second planetary gear sets 124 and 126 are active, and the motors/generators 156 and 172 may freewheel with no torque present.

Accordingly, the transmission 110 provides three mechanical points and four available fixed ratios, thereby minimizing electrical losses in the motors/generators while providing maximum power quickly in the first mode via the lock-up clutch 175.

It should be understood that the exact location of the aforesaid mechanical points is determined not only by the number of teeth on the inner and outer gear members of the planetary gear sets, but also by the rotational speed of the input shaft 112. Hence, with the number of teeth disclosed for the inner and outer gear members in the exemplary embodiment, an increase in the speed of the input shaft 112 will shift the locations of the mechanical points to higher vehicular speeds, and conversely, a reduction in the speed of the input member 112 will shift the mechanical points to lower vehicular speeds.

The reverse mode of operation is effected by having the ECU 38 operate the second motor/generator 172 as a motor, but reversing its rotational direction from the direction in which the second motor/generator 172 rotates when the vehicle begins to move forwardly from a stationary position in the first mode of operation.

Thus, the two-mode, compound-split, electro-mechanical transmission 110 uses a lock-up clutch and provides four available mechanical points. It enables maximum power to be reached more quickly for towing and hauling, and enables the use of smaller electrical components. By providing fixed ratios in an electrically variable transmission, maximum fuel economy is achieved at a reasonable cost.

The lock-up clutch 175 shown schematically between the planet carrier 144 and the sun gear 140 may also be located to connect the ring gear 138 and the sun gear 140 and will provide the same lockup function. Alternatively, the lock-up clutch 175 may connect the sun gear 140 and ring gear 148 of the second planetary gear set 126. As a further alternative, the lock-up clutch 175 may connect the carrier 136 and ring gear 130 of the first planetary gear set 124.

During operation, again referring to FIG. 1, the vehicle 30 is operated by providing power to the wheels 36 with the combustion engine 48 and the electric motor 50 in an alternating manner and/or with the combustion engine 48 and the electric motor 50 simultaneously. In order to power the electric motor 50, DC power is provided from the battery 42 to the inverter 44, which converts the DC power into AC power, before the power is sent to the electric motor 50. As will be appreciated by one skilled in the art, the conversion of DC power to AC power is substantially performed by operating (i.e., repeatedly switching) the transistors within the inverter 44 at a "switching frequency".

Generally, the controller 56 produces a signal for controlling the switching action of the inverter 44. As one example, the controller 56 produces a discontinuous PWM (DPWM) signal having a single zero vector associated with each switching cycle of the inverter 44. The inverter 44 then converts the PWM signal to a modulated voltage waveform for operating the motor 50. In a preferred embodiment, the controller 56 produces a PWM signal that controls the power inverter 44 to maintain the switching frequency of the power inverter 44 at a first, relatively high, set frequency responsive to a commanded torque of the electric motor 50 being below a first level. The controller 56 furthermore produces a PWM signal that controls the power inverter to provide a signal controlling the power inverter to determine the switching frequency of the power inverter as a function of the commanded torque of the electric motor while maintaining the switching frequency above a dynamic frequency limit, when the commanded torque is between the first and second levels.

This configuration of the drive system ensures good control and efficient use of power in the electric motor drive system. Specifically, the switching frequency of a PWM inverter affects the power losses in semiconductor switches. Thus, lowering the switching frequency can reduce power losses. However, at higher motor speeds, a higher switching frequency is desirable to maintain an adequate pulse ratio for precise controllability of the electric motor. Additionally, it is desirable to maintain the switching frequency above levels that cause excessive noise emissions. Third, the switching frequency affects the maximum controllable stator fundamental frequency. Fourth, the switching frequency can affect the phase ripple current, which can affect losses in both the inverter and motor. Additionally, the ripple current can cause unwanted torque ripple in the drive.

The inverter switching losses can be roughly described in equation 1. Specifically, equation 1 shows of switching losses $P_{SW}$ are proportionate to voltage $V_{dc}$, phase current $I_{ph}$ and switching frequency $f_{sw}$.

$$P_{sw} \propto V_{dc} I_{ph} f_{sw} \tag{1}$$

Thus, to maintain constant switching losses the switching frequency could be adjusted to be inversely proportional to the phase current. Since the phase current is roughly proportional to the motor torque (in the unsaturated case, and below base speed), phase current can be roughly equated to motor torque. Thus, adjusting the switching frequency as a function inversely proportional to motor torque will tend to maintain constant switching losses in the semiconductor devices Furthermore, acoustic noise can be generated by the motor due to the switching frequency. In general, the human ear is most sensitive to frequencies in the range of 1 kHz to 5 kHz. Thus, to minimize acoustic noise it is desirable to operate inverter at a much higher range, for example 8 kHz.

In general, the fundamental electrical frequency ($f_e$) of an electric motor is proportional to motor speed. To control the stator currents in a stable manner, the ratio of switching frequency to fundamental electrical frequency needs to remain sufficiently high. This ratio is sometimes referred to as a pulse ratio. For example, in some typical motor controls a pulse ratio of about 10:1 is needed to guarantee stable operation. Thus, it is desirable to maintain the switching frequency above a level that prevents the pulse ratio from dropping below the amount needed to guarantee stable operation.

There are thus conflicting goals with respect to the switching frequency. The embodiments of the invention are configured to control the switching frequency to be at high value to reduce acoustic noise and improve control at high speeds and low torque, and then reduce the switching frequency at high torque and current to reduce power loss and protect semiconductor switches from thermal overstress.

Returning to FIGS. 1-3, the controller 56 is thus configured to produce a PWM signal that controls the power inverter 44 to maintain the switching frequency of the power inverter 44 at a first, relatively high, set frequency responsive to a commanded torque of the electric motor 50 being below a first level. The controller 56 furthermore produces a PWM signal that controls the power inverter to provide a signal controlling the power inverter to determine the switching frequency of the power inverter as a function of the commanded torque of the electric motor while maintaining the switching frequency above a dynamic frequency limit, when the commanded torque is between the first and second levels.

In general, the first set frequency is set at a relatively high level that provides good control over the electric motor 50, without exceeding the frequency response of the switches in the inverter 44, or causing excessive heat due to switching losses. For example, in some embodiments the first set frequency will comprise a switching frequency of 8 kHz.

At intermediate motor speeds, the inverter 44 is operated with the switching frequency that varies as a function of torque. In general, the switching frequency is reduced as commanded torque increases, and a variety of functional relationships between switching frequency and torque can be used to accomplish this. For example, the relationship between switching frequency and torque can be linear, non-linear or any combination thereof during intermediate motor speeds.

As stated above, during operation of the electric motor 50 the switching frequency is varied as a function of commanded torque. However, at the same time, the operation of the inverter 44 is controlled to ensure that the switching frequency is maintained above a dynamic frequency limit. In general, the dynamic frequency limit itself varies with, and is responsive to motor speed. The dynamic frequency limit is preferably implemented to allow a sufficient reduction in switching frequency to reduce power losses while maintaining a high enough switching frequency to maintain good current control at the motors present speed. Furthermore, the dynamic frequency limit is preferably selected to limit acoustic noise to acceptable levels.

In one embodiment, the dynamic frequency limit is a function of motor speed when the electric motor is being operated at intermediate speeds, i.e., between a first speed level and a second speed level. Then, when the motor speed is below first speed level, the dynamic frequency limit is maintained at a relatively low specified, set frequency.

For example, the dynamic frequency limit can be selected to maintain a specified pulse ratio during operation of the electric motor, where the pulse ratio is generally defined as a ratio of switching frequency to fundamental frequency. As the fundamental frequency is related to motor speed, configuring the dynamic limit to maintain a specified pulse ratio effectively determines the dynamic frequency limit as a function of motor speed. Maintaining a high pulse ratio assures a sufficient amount of cycles in the inverter 44 to provide accurate control over the current in the electric motor 50. Thus, the dynamic frequency limit is implemented to make sure that as motor speed increases, the frequency limit also increases to ensure that effective motor control is maintained.

Additionally, the dynamic frequency limit can be set to operate at a relatively high frequency limit when the electric motor is operated at speeds above the second speed level. In one specific embodiment, this high frequency limit can be same frequency the inverter is operated at low torque levels (e.g., 8 kHz).

Figure 6:
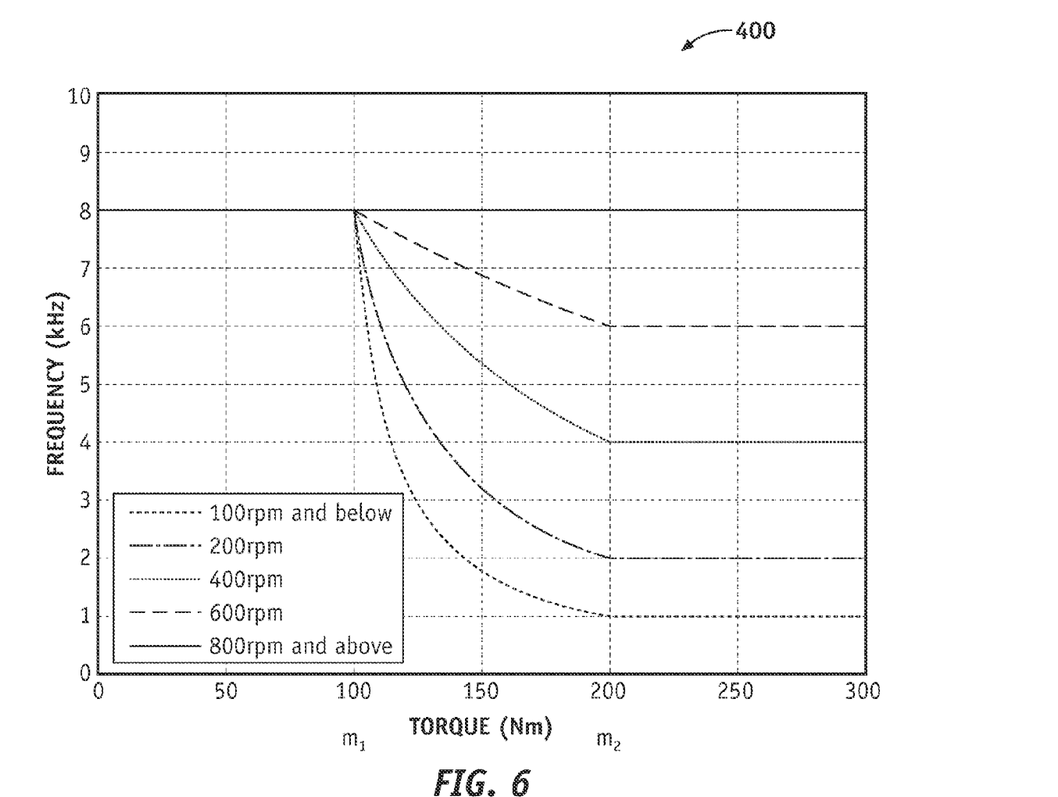
FIG. 6 is a graphical representation of exemplary switching frequency control scheme.

Turning now to FIG. 6, a graphical representation 400 of an exemplary switching frequency control scheme is illustrated. In this representation, the plot of the switching frequency as a function of the torque command is illustrated for motor speed values of 100, 200, 400, 600, 800 and 800 RPM. Below a first torque value of $m_1$ (e.g., 100 Nm), the switching frequency is held to a predetermined maximum value (e.g., 8 kHz) regardless of motor speed. As the torque command exceeds the first value, the switching frequency is reduced inversely proportional to torque while maintaining the switching frequency above a dynamic frequency limit.

The dynamic frequency limit itself varies with, and is responsive to motor speed. This causes the separate plots for each of the illustrated motor speed values. In the representation of FIG. 6, the dynamic frequency limit is a function of motor speed when the electric motor is being operated at intermediate speeds, i.e., between a first speed level and a second speed level. Then, when the motor speed is below first speed level, the dynamic frequency limit is maintained at a relatively low specified, set frequency of 1 kHz.

Figure 7:
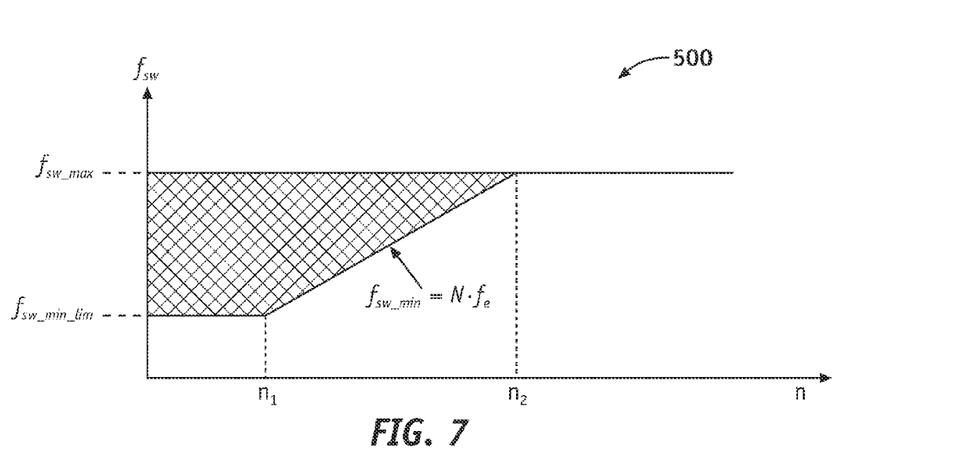
FIG. 7 is a graphical representation of a dynamic frequency limit control scheme.

Turning now to FIG. 7, a graphical representation 500 of an exemplary dynamic frequency limit scheme is illustrated. This is an example of the type of representation, that when used with function to control switching frequency as a function of torque, results in switching frequency values illustrated in FIG. 6.

In the representation 500, the dynamic limit of the switching frequency is plotted as function of motor speed. At low motor speeds below speed $n_1$ (e.g., 100 RPM), the dynamic limit of the switching frequency will be held at a preset low set frequency ($f_{sw\_min\_lim}$). This level is selected to maintain good control while avoiding excessive acoustic noise and power loss, and is set at 1 kHz in this example. Of course, this is just one example, and other limit values could also be used.

At intermediate motor speeds (between $n_1$ and $n_2$ (e.g., 800 RPM)) the switching frequency of the inverter will be determined as function of motor speed. In the illustrated embodiment, the function is configured to maintain a desired minimum pulse ratio (N) between the switching frequency ($f_{sw}$) and the fundamental frequency ($f_e$). During operation of the electric motor, the switching frequency of the inverters is operated as a function of commanded torque, reducing the switching frequency as the commanded torque is increased, while the switching frequency is maintained above dynamic frequency limit that is dependent on motor speed. Stated another way, motor speed determines the minimum possible switching frequency, with the torque command slewing the actual switching frequency between the maximum and the speed dependent minimum frequencies. Thus, the operational range of switching frequency $f_{sw}$ is illustrated in FIG. 7 as the hatched area above the dynamic frequency limit $f_{sw\_min}$ and below the maximum set switching frequency of $f_{sw\_max}$. It should be noted, that above speeds of $n_2$, the dynamic frequency limit $f_{sw\_min}$ and the maximum frequency $f_{sw\_max}$ converge, and thus the motor will operate at the maximum switching frequency $f_{sw\_max}$ above speeds of $n_2$ regardless of torque.

It should again be noted that the RPM values of $n_1$ and $n_2$, and the frequency values of $f_{sw\_max}$ and $f_{sw\_min\_lim}$, and the slope and/or function of the dynamic frequency limit $f_{sw\_min}$ are merely exemplary, and that other values and functions could be used depending on the details of the application.

Another exemplary illustration of the techniques for determining the switching frequency are illustrated in Equation 2.

if $(|m^*|<m_1) f_{sw} = f_{sw\_max}$ else if $(|m^*|>m_2) f_{sw} = f_{sw\_min}$ $$\text{else } f_{sw} = \frac{f_{sw\_max}}{1 + \left(\frac{f_{sw\_max}}{f_{sw\_min}} - 1\right)\left(\frac{|m^*| - m_1}{m_2 - m_1}\right)} \quad (2)$$

where
$f_{sw\_min} = f_{sw\_min\_lim}$ below speed $n_1$
$f_{sw\_min} = N^* f_e$ between $n_1$ and $n_2$
$f_{sw\_min} = f_{sw\_max}$ above speed $n_2$
$f_{sw\_max} =$ a selected constant
$f_{sw\_min\_lim} =$ a selected constant In equation 2, the switching frequency is determined as a function of the commanded torque m* while being maintained above a dynamic frequency limit $f_{sw\_min}$. If the commanded torque is less than a torque level $m_1$, the switching frequency is set to the maximum frequency $f_{sw\_max}$. If the commanded torque above a torque level $m_2$, the switching frequency $f_{sw}$ is reduced down to the dynamic frequency limit $f_{sw\_min}$. At intermediate torque values, the switching frequency is a function of torque and the frequency limits.

Also shown in the example of equation 2, the dynamic frequency limit $f_{sw\_min}$ is itself a function of motor speed, set equal to $f_{sw\_max}$ at speeds above $n_2$, set equal to a minimum value $f_{sw\_min\_lim}$ at speeds below $n_1$, and determined as function of fundamental frequency $f_e$ and a desired pulse ratio N at intermediate speeds.

Again, the values selected for these various parameters would be selected based on the needs of a particular application. For example, the frequency profile may be selected to minimize junction temperature swings for frequent operating points, in order to extend the lifetime of the devices. For example, $m_1$ can be selected to maintain $f_{sw}$ at its maximum value during a typical engine crank event, to avoid acoustic noise problems. Also, it should be noted that equation 2 illustrates just one exemplary function for adjusting switching frequencies as a function of torque (i.e., inversely proportional). However, alternate functions could also be used. Likewise, while equation 2 illustrates the dynamic frequency limit $f_{sw\_min}$ determined as a linear function of fundamental frequency $f_e$ at intermediate speeds, alternate functions could also be used.

The various embodiments thus provide a system and method that controls the power inverter by, responsive to a commanded torque of the electric motor being below a first torque level, controlling the power inverter to set a switching frequency of the power inverter at a first set frequency; and, responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit. The method reduces switching frequencies in the inverter at high commanded torques, while maintaining the switching frequencies above dynamic frequency limit that provides effective control over the motor. This reduces power loss and thus improves the efficiency of the system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a power inverter coupled to an electric motor in an electric drive system of an automobile, wherein the electric drive system includes a prime mover power source, a two-mode, compound-split, electro-mechanical transmission coupled to the prime mover power source, the electro-mechanical transmission comprising a first motor and a second motor, wherein the power inverter is coupled to the first and second motors, the method comprising:
   responsive to a commanded torque of the first motor being below a first torque level, controlling, by a processor, the power inverter to set a switching frequency of the power inverter at a first set frequency; and
   responsive to the commanded torque of the first motor being between the first torque level and a second torque level, controlling, by the processor, the power inverter to determine the switching frequency of the power inverter as a function of the commanded torque of the electric motor while maintaining the switching frequency above a dynamic frequency limit.

2. The method of claim 1, wherein the dynamic frequency limit is determined by:
   responsive to the motor speed of the first motor being between a first speed level and a second speed level, determining the dynamic frequency limit as a function of the motor speed; and
   responsive to the motor speed being below the first speed level, determining the dynamic frequency limit to set the dynamic frequency limit at a second set frequency.

3. The method of claim 2, wherein the dynamic frequency limit is further determined by, responsive to the motor speed being above second speed level, determining the dynamic frequency limit to set the dynamic frequency limit at the first set frequency.

4. The method of claim 2, wherein the step of determining the dynamic frequency limit as a function of the motor speed comprises determining the dynamic frequency limit to maintain a set pulse ratio of switching frequency to the motor speed.

5. The method of claim 1, wherein the step of controlling the power inverter to determine the switching frequency of the power inverter as a function of the commanded torque of the electric motor while maintaining the switching frequency above the dynamic frequency limit comprises decreasing the switching frequency as the commanded torque increases.

6. The method of claim 1, wherein the step of controlling the power inverter to determine the switching frequency of the power inverter as a function of the commanded torque of the electric motor while maintaining the switching frequency above the dynamic frequency limit comprises determining the switching frequency as:

$$f_{sw} = \frac{f_{sw\_max}}{1 + \left(\frac{f_{sw\_max}}{f_{sw\_min}} - 1\right)\left(\frac{|m^*| - m_1}{m_2 - m_1}\right)}$$

where $f_{sw}$ is the switching frequency, m* is the commanded torque, $f_{sw\_max}$ is the first set frequency, $f_{sw\_min}$ is the dynamic frequency limit, $m_1$ is the first torque level, and $m_2$ is the second torque level.

7. The method of claim 1, wherein the electric drive system includes a second power inverter corresponding to the second motor, further comprising:

responsive to a second commanded torque of the second motor being below the first torque level, controlling the second power inverter to set a switching frequency of the second power inverter at a first set frequency; and responsive to the commanded torque of the second motor being between the first torque level and a second torque level, controlling the second power inverter to determine the switching frequency of the second power inverter as the function of the commanded torque of the electric motor while maintaining the switching frequency above the dynamic frequency limit.

8. An automotive electric drive system comprising:

a prime mover power source;

a two-mode, compound-split, electro-mechanical transmission coupled to the prime mover power source, the electro-mechanical transmission comprising first and second motors;

a power inverter coupled to the first and second motors; and a processor coupled to the first and second motors and the power inverter, the processor being configured to:

responsive to a commanded torque of the first motor being below a first torque level, provide a signal controlling the power inverter to set a switching frequency of the power inverter at a first set frequency;

responsive to the commanded torque of the first motor being between the first torque level and a second torque level, provide a signal controlling the power inverter to determine the switching frequency of the power inverter as a function of the commanded torque of the electric motor while maintaining the switching frequency above a dynamic frequency limit.

9. The automotive drive system of claim 8, wherein the electro-mechanical transmission further comprises:

an input member to receive power from the prime mover;

an output member to deliver power from the electro-mechanical transmission;

first, second, and third coaxially-aligned planetary gear arrangements, each planetary gear arrangement utilizing first, second and third gear members, the first and second motors being coaxially aligned with each other and with the three planetary gear arrangements, at least one of the first, second, and third gear members in the first or second planetary gear arrangement being connected to the first motor, and another one of the first, second, and third gear members in the second and third planetary gear arrangements being connected to the second motor, one of the gear members of the first planetary gear arrangement being continuously connected to the input member;

a first torque-transmitting mechanism to selectively connect one of the gear members associated with each of the planetary gear arrangements to each other and to the output member;

a second torque-transmitting mechanism to selectively connect one of the gear members of the third planetary gear set with ground;

a third torque-transmitting mechanism to selectively connect one of the gear members of the second planetary gear set with another of the gear members of the second planetary gear set;

a first interconnecting member continuously connecting one of the members of the first planetary gear set with one of the members of the second planetary gear set; and a second interconnecting member continuously connecting one of the members of the second planetary gear set with one of the members of the third planetary gear set.

10. The automotive electric drive system of claim 9, wherein the processor is further configured to:

responsive to the motor speed of the first motor being between a first speed level and a second speed level, determine the dynamic frequency limit as a function of the motor speed; and responsive to the motor speed being below the first speed level, determine the dynamic frequency limit to set the dynamic frequency limit at a second set frequency.

11. The automotive electric drive system of claim 10, wherein the processor is further configured to, responsive to the motor speed being above second speed level, determine the dynamic frequency limit to set the dynamic frequency limit at the first set frequency.

12. The automotive electric drive system of claim 11, wherein the processor is configured to determine the dynamic frequency limit as a function of the motor speed to maintain a set pulse ratio of switching frequency to the motor speed.

13. The automotive electric drive system of claim 8, wherein the function of the commanded torque decreases the switching frequency as the commanded torque increases.

14. The automotive electric drive system of claim 8, wherein the function of the commanded torque comprises:

$$f_{sw} = \frac{f_{sw\_max}}{1 + \left(\frac{f_{sw\_max}}{f_{sw\_min}} - 1\right)\left(\frac{|m^*| - m_1}{m_2 - m_1}\right)}$$

where $f_{sw}$ is the switching frequency, m* is the commanded torque, $f_{sw\_max}$ is the first set frequency, $f_{sw\_min}$ is the dynamic frequency limit, $m_1$ is the first torque level, and $m_2$ is the second torque level.

15. The automotive electric drive system of claim 8, wherein the electric drive system includes a second power inverter corresponding to the second motor, and wherein the processor is further configured to:

responsive to a second commanded torque of the second motor being below the first torque level, controlling the second power inverter to set a switching frequency of the second power inverter at a first set frequency; and responsive to the commanded torque of the second motor being between the first torque level and a second torque level, controlling the second power inverter to determine the switching frequency of the second power inverter as the function of the commanded torque of the electric motor while maintaining the switching frequency above the dynamic frequency limit.

16. An automotive drive system comprising:

a prime mover power source;

a two-mode, compound-split, electro-mechanical transmission coupled to the prime mover power source, the electro-mechanical transmission comprising:

an input member to receive power from the prime mover;

an output member to deliver power from the electromechanical transmission;

first and second motors being coaxially aligned;

first, second, and third coaxially aligned planetary gear arrangements, each planetary gear arrangement utilizing first, second and third gear members, the first and second motors being coaxially aligned with the three planetary gear arrangements, at least one of the first, second, and third gear members in the first or second planetary gear arrangement being connected to the first motor, and another one of the first, second, and third gear members in the second and third planetary gear arrangements being connected to the second motor, one of the gear members of the first planetary gear arrangement being continuously connected to the input member;

a first torque-transmitting mechanism to selectively connect one of the gear members associated with each of the planetary gear arrangements to each other and to the output member;

a second torque-transmitting mechanism to selectively connect one of the gear members of the third planetary gear set with ground;

a third torque-transmitting mechanism to selectively connect one of the gear members of the second planetary gear set with another of the gear members of the second planetary gear set;

a first interconnecting member continuously connecting one of the members of the first planetary gear set with one of the members of the second planetary gear set; and a second interconnecting member continuously connecting one of the members of the second planetary gear set with one of the members of the third planetary gear set;

a power inverter coupled to the first and second motors;

an energy storage device coupled to the power inverter; and a processor coupled to the first and second motors and the power inverter, the processor being configured to:

responsive to a commanded torque of the first motor being below a first torque level, provide a signal controlling the power inverter to set a switching frequency of the power inverter at a first set frequency;

responsive to the commanded torque of the first motor being between the first torque level and a second torque level, provide a signal controlling the power inverter to determine the switching frequency of the power inverter as a function of the commanded torque of the electric motor while maintaining the switching frequency above a dynamic frequency limit; wherein the function of the commanded torque is selected to decrease switching frequency as the commanded torque increases, and wherein the dynamic frequency limit determined by:

responsive to the motor speed of the first motor being between a first speed level and a second speed level, determining the dynamic frequency limit as a function of the motor speed to maintain set pulse ratio of motor switching frequency to motor speed;

responsive to the motor speed being below the first speed level, determining the dynamic frequency limit to set the dynamic frequency limit at a second set frequency; and responsive to the motor speed being above second speed level, determining the dynamic frequency limit to set the dynamic frequency limit at the first set frequency.

17. The automotive electric drive system of claim 16, wherein the function of the commanded torque comprises:

$$f_{sw} = \frac{f_{sw\_max}}{1 + \left(\frac{f_{sw\_max}}{f_{sw\_min}} - 1\right)\left(\frac{|m^*| - m_1}{m_2 - m_1}\right)}$$

where $f_{sw}$ is the switching frequency, $m^*$ is the commanded torque, $f_{sw\_max}$ is the first set frequency, $f_{sw\_min}$ is the dynamic frequency limit, $m_1$ is the first torque level, and $m_2$ is the second torque level.

* * * * *